(12) United States Patent
Kim

(10) Patent No.: US 6,172,855 B1
(45) Date of Patent: Jan. 9, 2001

(54) ACTUATOR LATCHING DEVICE IN HARD DISK DRIVE

(75) Inventor: Sung-Wook Kim, Seoul (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/146,944

(22) Filed: Sep. 3, 1998

(30) Foreign Application Priority Data

Sep. 3, 1997 (KR) .................................................. 97-45616

(51) Int. Cl.⁷ .................................................. G11B 21/22
(52) U.S. Cl. ........................................ 360/256; 360/244.9
(58) Field of Search .................................. 360/105–106, 360/256, 256.1, 256.3, 256.4, 256.5, 245.7, 254.3, 254.4, 254.6, 254.7, 254.8, 255, 253.2, 255.3, 255.5, 255.6, 255.7, 255.9, 244.2, 244.3, 244.8, 244.9; 369/244

(56) References Cited

U.S. PATENT DOCUMENTS

| | | |
|---|---|---|
| 4,949,206 | 8/1990 | Phillips et al. ...................... 360/106 |
| 5,012,371 | 4/1991 | Pollard et al. ...................... 360/105 |
| 5,109,310 | 4/1992 | Ohkijita et al. ...................... 360/106 |
| 5,134,608 | 7/1992 | Strickler et al. ...................... 369/215 |
| 5,231,549 * | 7/1993 | Morehouse et al. ................... 360/75 |
| 5,363,261 * | 11/1994 | Eckberg et al. ...................... 360/105 |
| 5,402,290 | 3/1995 | Daniel ................................. 360/106 |
| 5,422,770 | 6/1995 | Alt ..................................... 360/105 |
| 5,448,436 | 9/1995 | Albrecht .............................. 360/105 |
| 5,600,516 | 2/1997 | Phillips et al. ....................... 360/105 |
| 5,715,119 | 2/1998 | Williams et al. ..................... 360/105 |
| 5,745,325 | 4/1998 | Matsumoto ........................... 360/105 |
| 5,812,346 * | 9/1998 | Williams et al. ..................... 360/105 |
| 5,875,073 * | 2/1999 | Andrews et al. ..................... 360/105 |
| 5,905,606 * | 5/1999 | Johnson et al. ...................... 360/105 |

* cited by examiner

Primary Examiner—David L. Ometz
Assistant Examiner—Chen Tianjie
(74) Attorney, Agent, or Firm—Robert E. Bushnell, Esq.

(57) ABSTRACT

An actuator latching device in a hard disk drive is provided. In the actuator latching device according to the principles of the present invention, an elastic rubber stopper is mounted to one area of a hard disk body selected from among a base and a cover, and an aperture is formed in an inelastic actuator of the hard disk drive. The actuator is latched by the latching device while the aperture of the actuator receives the stopper therein when the actuator is parked.

20 Claims, 4 Drawing Sheets

ACTUATOR LATCHING DEVICE IN HARD DISK DRIVE

CLAIM OF PRIORITY

This application makes reference to, incorporates the same herein, and claims all benefits accruing under 35 U.S.C. § 119 from an application entitled Actuator Latching Device in Hard Disk Drive earlier filed in the Korean Industrial Property Office on Sep. 3, 1997, and there duly assigned Serial No. 45616, a copy of which is annexed hereto.

BACKGROUND OF THE INVENTION

1. Technical Field

The present invention relates to a hard disk drive, and more particularly to an actuator latching device of a hard disk drive.

2. Related Art

Computer systems are information handling systems that are utilized by many individuals and businesses today. A conventional computer system can be defined as a microcomputer that includes a central processing unit (CPU), a volatile memory, a non-volatile memory, a display monitor, a keyboard, a mouse, a floppy disk drive, a compact disc-read only memory (CD-ROM) drive, a modem, a hard disk storage device, and a printer. Typically, a computer system's main board, which is a printed circuit board known as a motherboard, is used to electrically connect these components together.

The hard disk storage device can also be referred to as a hard disk drive containing a hard disk, wherein the hard disk is the actual storage medium. A platter is another term for a hard disk. The hard disk drive is an auxiliary memory unit of the computer system. The hard disk drive contains components enabling data to be received from the associated computer system and then written to the hard disk, and also enabling data to be read from the hard disk and then transmitted to the associated computer system. The hard disk drive includes a magnetic read/write head which flies above the surface of the hard disk while the hard disk is rotating.

The hard disk has a plurality of concentric tracks for storing data. Each track has a plurality of sectors. Some hard disk drives contain several hard disks, each hard disk being horizontally mounted on one shared vertical spindle-axis, so that the hard disks form a stack of hard disks. When a disk drive has a plurality of hard disks, with each disk having its own read/write head, every read/write head is aligned on a separate track of its associated hard disk. A head actuator locks all the heads together so that all heads are at the same position from the center of the disk along a given radius. The vertical stack of tracks formed by such an arrangement is referred to as a cylinder. The number of cylinders in a hard disk drive is the same as the number of tracks on a hard disk of that hard disk drive.

Primary functions of the hard disk drive include receiving data from the associated computer system, writing the data onto the hard disk without loss of the data, and then reading and transmitting the data to the computer system when necessary. Therefore, a manufacturer of the hard disk drive not only makes an effort to maximize data recording capacity, but also looks for various means to prevent data loss.

When a hard disk drive pauses or power is turned off, an actuator moves the magnetic read/write head to a parking zone defined at a predetermined position of the hard disk, in order to protect data recorded on the disk from damage caused by contact between the magnetic head and a data surface of the disk.

Exemplars of recent efforts in the art include U.S. Pat. No. 5,745,325 for Magnetic Disk Rive Having an Improved Outer Stopper Mechanism issued to Matsumoto, U.S. Pat. No. 5,715,119 for Rotating Crash Stop Assembly for Hard Disk Drives issued to Williams et al, U.S. Pat. No. 5,600,516 for Deflectable Crash Stop in Acutuator Arm Assembly Overmold issued to Phillips et al., U.S. Pat. No. 5,448,436 for Disk Drive with Shock-resistant Rotary Actuator issued to Albrecht, U.S. Pat. No. 5,422,770 for Shock Bumper for a Head/disk Suspension issued to Alt, U.S. Pat. No. 5,402,290 for One Piece Limit Stop for Disc Drive issued to Daniel, U.S. Pat. No. 5,134,608 for Disk Drive Crash Stop issued to Strickler et al., U.S. Pat. No. 5,109,310 for Disk Drive Device with Unified Actuator Assembly issued to Ohkjita et al., U.S. Pat. No. 5,012,371 for Disk Drive Crash Stop/actuator Latch issued to Pollard et al., and U.S. Pat. No. 4,949,206 for Crash Stop for Rotary Disk Drive Actuator issued to Phillips et al.

While these recent efforts provide advantages, I note that they fail to adequately address how an actuator can be efficiently latched in a hard disk drive, without an excessive loss of the hard disk's memory capacity. In addition, these recent efforts fail to provide a simple actuator latching device able to lower manufacturing costs.

SUMMARY OF THE INVENTION

To solve the above problems and others, an object of the present invention is to provide an actuator latching device for fixedly positioning a magnetic head at a parking zone of a disk when power is off or when a hard disk drive is inoperative.

Another object of the present invention is to provide an actuator latching device which is simplified with a minimized number of parts to increase positioning accuracy, lifetime, and reliability.

Still another object of the present invention is to provide an actuator latching device for completely eliminating interference caused by force of a magnet at a data zone adjacent to a parking zone when a magnet latch is used.

To achieve the above objects, there is provided an actuator latching device in a hard disk drive. In the actuator latching device, an elastic rubber stopper is provided on one of a body base and a cover, and a hole is formed into an inelastic actuator, for inserting the stopper therein.

To achieve these and other objects in accordance with the principles of the present invention, as embodied and broadly described, the present invention provides a disk drive apparatus, comprising: a housing having a base and a cover; a disk being rotatably mounted in said housing and having a plurality of tracks; a head reading data from said disk and writing data to said disk when said head is located adjacent to said plurality of tracks, and said head not reading data and not writing data when said head is parked at a parking position not adjacent to said plurality of tracks; a stopping unit being mounted at said housing at a location corresponding to said parking position; and a head actuator being coupled to said housing, said head actuator moving said head across said plurality of tracks of said disk and to and from said parking position, said head actuator including an actuator arm coupled to said head, said actuator arm defining an aperture, the aperture receiving and engaging said stopping unit when said head is parked at said parking position, wherein the aperture receiving and engaging said stopping unit when said head is parked at said parking position immobilizes said head while said head is parked at said parking position.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
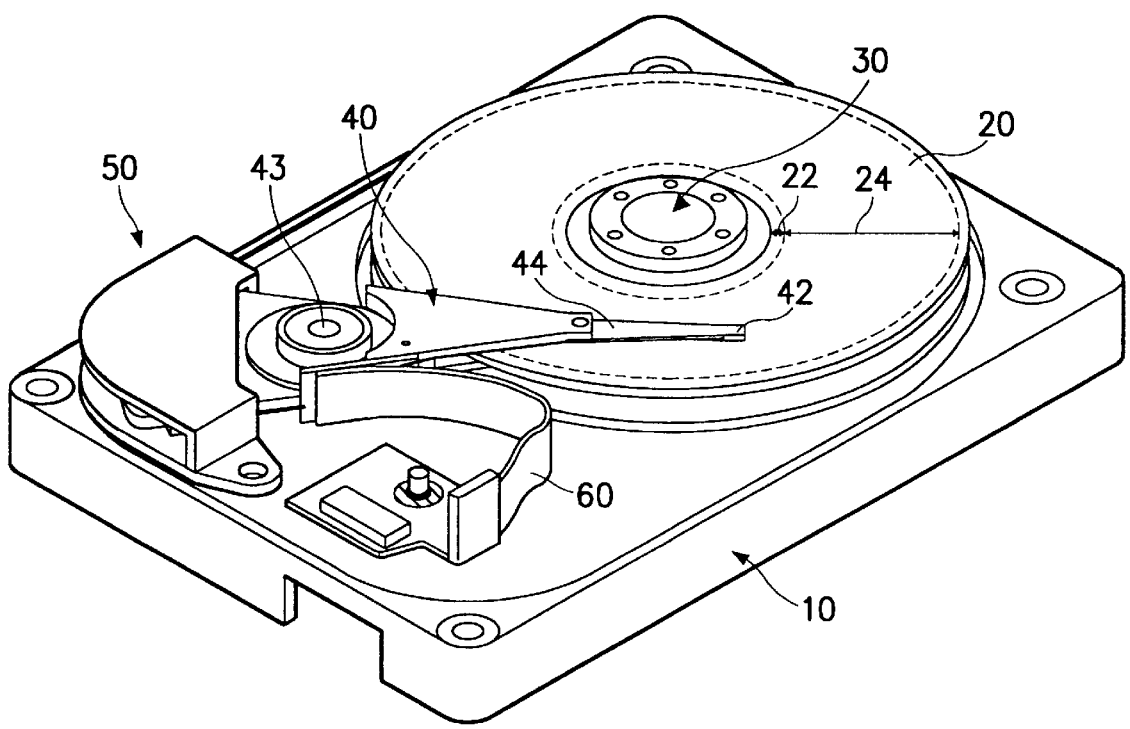
FIG. 1 is a perspective view of a hard disk drive.

Turn now to FIG. 1, which is a perspective view of a hard disk drive. A hard disk drive, an auxiliary memory device for a computer, is constituted as shown in FIG. 1. Referring to FIG. 1, the hard disk drive includes a disk 20 rotated at high speed by a spindle motor 30 installed on a body base 10, and an actuator 40 having a magnetic head 42 for recording and reproducing data on and from tracks of the disk 20.

The actuator 40 is installed to be rotatable around a pivot shaft 43. By moving a bobbin at an end of the actuator 40 by a voice coil motor (VCM) 50, the magnetic head 42 at the other end thereof writes or reads data on or from tracks of the disk 20, while moving between both ends of the disk 20. The magnetic head 42 at the tip of a head gimbal which moves over at least one surface of a disk flies over the disk 20 at a very low height by air flow generated on the surface of the disk 20 due to high-speed rotation of the disk 20.

When the hard disk drive pauses or power is off during the above operation, the actuator 40 moves the magnetic head 42 to a parking zone 22 defined at a predetermined position of the disk 20, in order to protect data recorded on the disk 20 from damage caused by contact between the magnetic head 42 and a data surface of the disk 20. Further, when power is on, the actuator 40 retracts the magnetic head 42 to a data zone 24, overcoming the fixing force. The magnetic head 42 is connected to a suspension 44.

The hard disk drive as operated above is connected to a printed circuit board (PCB) by a flexible printed circuit (FPC) 60 for supplying current to the magnetic head 42 and a coil at an end of the actuator 40, and receiving a signal. In the hard disk drive, a magnet latch relying on magnetic force is usually used as an actuator latching device, for latching the actuator 40 at the parking zone 22 when power is off, and moving the actuator 20 to the data zone 24 when power is on.

However, a conventional magnet latch as an actuator latching device requires many parts and has a complicated structure because a flux path of a magnet should be formed, using an iron-rich metal, and a metal piece should be fixed to an actuator to attach the actuator to the magnet.

With use of the magnet latch, it is very difficult to accurately position the actuator due to mutual attraction between the metal piece fixed to the actuator and the magnet when the actuator is located at a data zone adjacent to a parking zone. To completely eliminate the interference, the data zone should be located far from the parking zone, resulting in capacity loss.

Preferred embodiments according to the principles of the present invention will be described in detail with reference to the attached drawings. In the drawings, like reference numerals denote the same components, and a detailed description of related known function or structure of the present invention is avoided if it is deemed to obscure the subject matter of the present invention.

Figure 2:
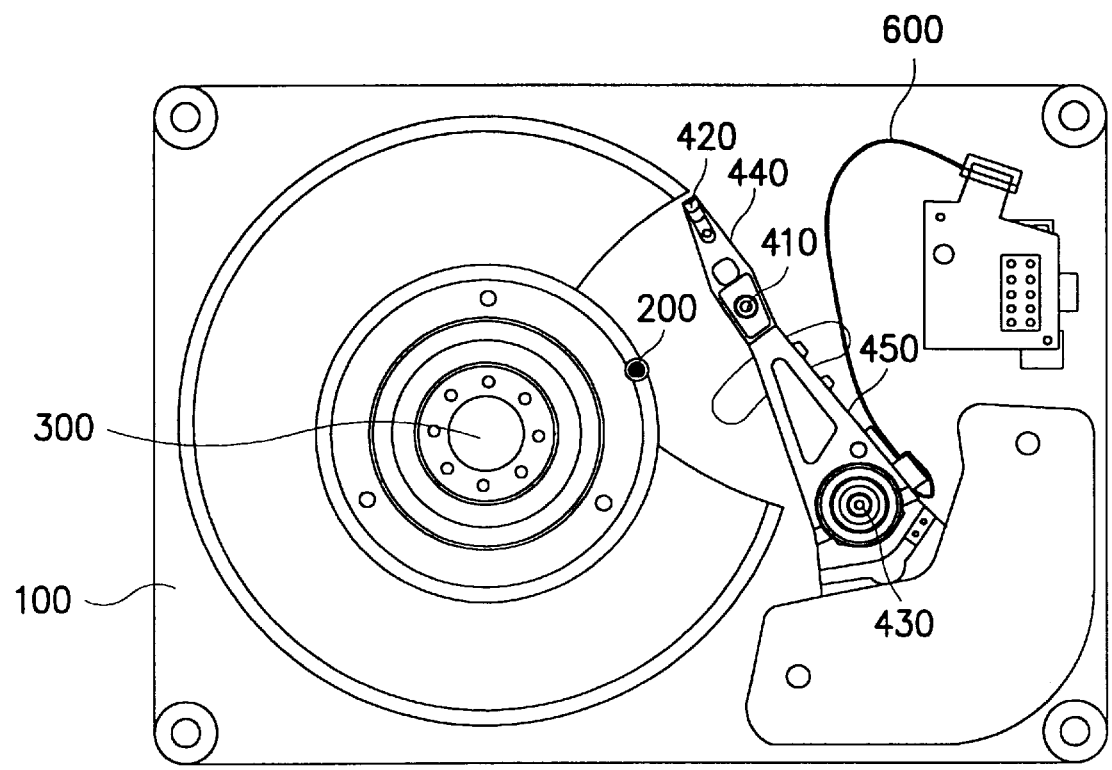
FIG. 2 is a view of a hard disk drive before an actuator parks a read/write head, in accordance with the principles of the present invention.
Figure 3:
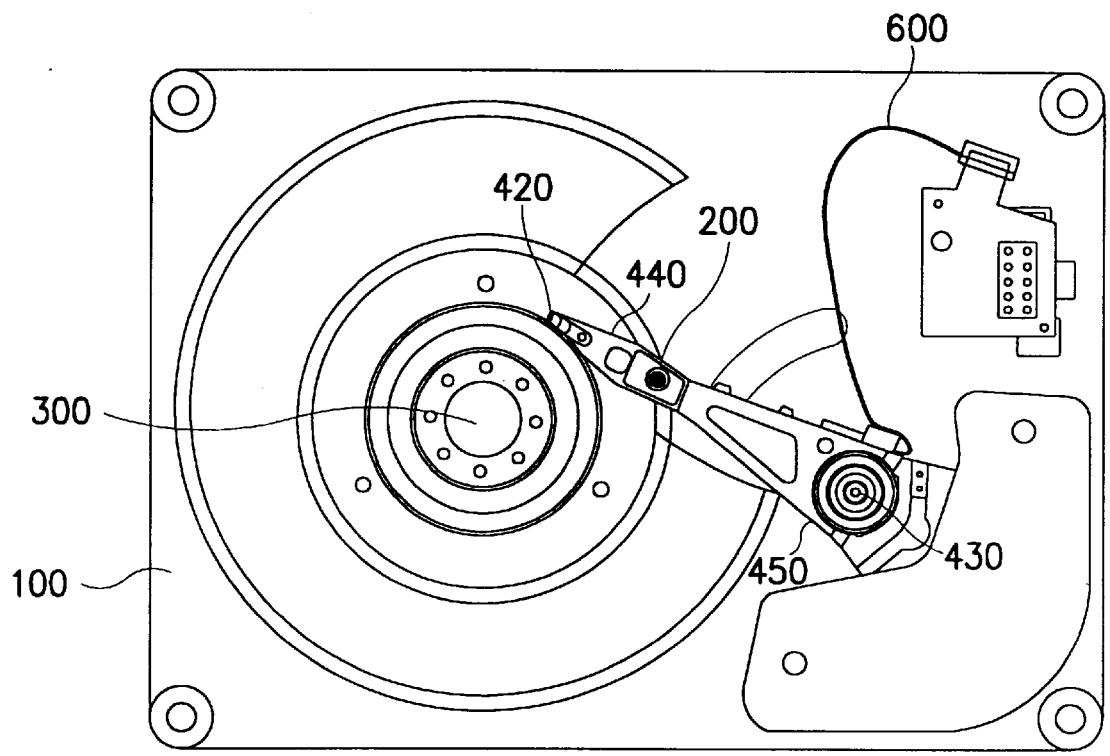
FIG. 3 is a view of the hard disk drive of FIG. 2 after the actuator parks the read/write head, in accordance with the principles of the present invention.

Refer now to FIG. 2, which is a view of a hard disk drive before an actuator parks a read/write head, in accordance with the principles of the present invention. Refer also to FIG. 3, which is a view of the hard disk drive of FIG. 2 after the actuator parks the read/write head, in accordance with the principles of the present invention. FIGS. 2 and 3 are plan views of a hard disk drive before and after an actuator parks a head according to an embodiment of the present invention, respectively. In the drawings, a disk is removed from the hard disk drive.

Referring to FIGS. 2 and 3, an actuator latching device in accordance with the principles of the present invention is simplified, compared to a conventional actuator latching device. A hole is formed into a body base 100 or a cover, and an elastic rubber stopper 200 or 210 is inserted into the hole. A slot or a hole 410 corresponding to the stopper 200 or 210 is formed into an actuator. The slot or hole 410 can be replaced with an existing counterpart of the actuator. The hole 410 is formed into a circle on an arm 450 (E-block) of the actuator. Alternatively, a hole necessarily formed by connecting the arm 450 to a suspension 440 can be used.

For parking, the actuator fixedly presses against the stopper 200 or 210, inserting the elastic rubber stopper 200 or 210 into the slot or the hole 410 of the actuator. For operation, the actuator is pushed apart from the stopper 200 or 210, pressing against the stopper 200 or 210. The hard disk drive as constituted above includes a disk (not shown) rotated at high speed by a spindle motor 300 installed on the body base 100, and the actuator having a magnetic head 420 for recording and reproducing data on and from tracks of the disk.

The magnetic head 420 at the tip of a head gimbal which moves over at least one surface of a disk flies over the disk at a very low height by air flow generated on the surface of the disk due to high-speed rotation of the disk. Here, possible introduction of a contaminant between the magnetic head 420 and the disk may cause a severe defect on the hard disk drive. When the hard disk drive pauses or power is off during the above operation, the magnetic head 420 at an end of the actuator moves to a parking zone defined at a predetermined track, in order to protect data recorded on the disk from damage caused by contact between the magnetic head 420 and a data surface. The hard disk drive as operated above is connected to an flexible printed circuit (FPC) 600, for supplying current to the magnetic head 420 at the end of the actuator, receiving a signal, and connecting a current terminal of a voice coil motor (VCM) to a terminal of a printed circuit board (PCB).

Figure 4A:
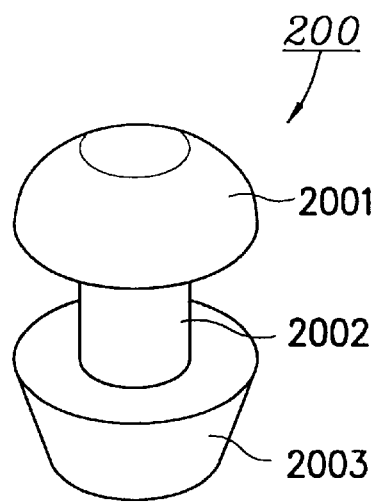
FIG. 4A is a perspective view of a first embodiment of a stopper, in accordance with the principles of the present invention.

Refer now to FIG. 4A, which is a perspective view of a first embodiment of a stopper, in accordance with the principles of the present invention. FIG. 4A is a perspective view of the stopper 200 according to a first embodiment of the present invention. The stopper 200 has a hemispherical upper portion 2001, a cylindrical middle portion 2002, and a clipped cone-shaped lower portion 2003. The upper portion 2001 is inserted into or removed from the hole 410 of the actuator when the actuator moves to the parking zone or the data zone. The lower portion 2003 is inserted into the hole of the base, for fixing the stopper 200. The stopper 200 is flexibly inserted into and removed from the hole 410 of the actuator of FIG. 2 because the stopper 200 is formed of rubber and the upper portion 2001 is hemispherical.

Figure 4B:
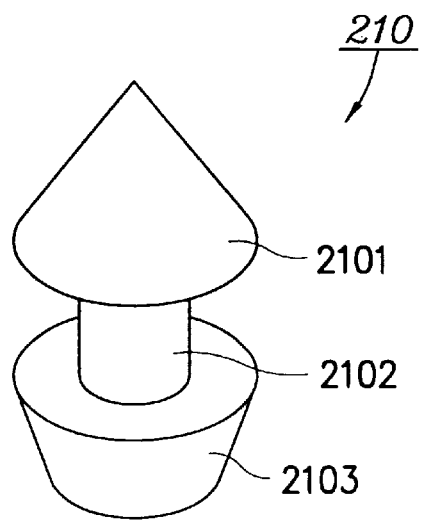
FIG. 4B is a perspective view of a second embodiment of a stopper, in accordance with the principles of the present invention.

Refer now to FIG. 4B, which is a perspective view of a second embodiment of a stopper, in accordance with the principles of the present invention. FIG. 4B is a perspective view of the stopper 210 according to a second embodiment of the present invention. Referring to FIG. 4B, the stopper 210 has a conical upper portion 2101, a cylindrical middle portion 2102, and a clipped cone-shaped lower portion 2103. The upper portion 2101 is inserted into or removed from the hole 410 of the actuator when the actuator moves to the parking zone or the data zone. The lower portion 2103 is inserted into the hole of the base, for fixing the stopper 210. The stopper 210 is flexibly inserted and removed into and from the hole 410 of the actuator of FIG. 2 because the stopper 210 is formed of rubber and the upper portion 2101 is conical. The stoppers of the present invention can be inserted and removed into and from the hole 410 of the actuator of FIG. 2 by shaping the upper portions into a hemisphere and a cone, and forming the stoppers of rubber. When the rubber stopper 200 or 201 is inserted into hole 410 of the arm 450, the arm 450 is held in the parking position by a friction force between the rubber stopper and the edge of the hole.

Due to these rubber stoppers 200 and 210 and the metal hole 410 of the actuator, the actuator rotated around the pivot shaft maintains force enough to overcome the contraction of the stoppers, thereby increasing positioning accuracy and the lifetime of a head. On the contrary, the stoppers 200 and 210 may be formed of a metal, while the hole 410 may be formed of a rubber.

As described above, the actuator latching device of the present invention simply and accurately latches an actuator without a complicated device, to fixedly position a magnetic head at a parking zone of a disk when power is off or a hard disk drive is inoperative. As a result, positioning accuracy, lifetime, and reliability are increased, and magnet force-induced interference at a data zone adjacent to the parking zone, which is a problem encountered with a conventional magnet latch, can be entirely eliminated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments failing within the scope of the appended claims.

What is claimed is:

1. A disk drive apparatus, comprising:

a housing having a base and a cover;

a disk being rotatably mounted in said housing and having a plurality of tracks;

a head reading data from said disk and writing data to said disk when said head is located adjacent to said plurality of tracks, and said head not reading data and not writing data when said head is parked at a parking position not adjacent to said plurality of tracks;

a stopping unit being mounted at said housing at a location corresponding to said parking position; and a head actuator being coupled to said housing, said head actuator moving said head across said plurality of tracks of said disk and to and from said parking position, said head actuator including an actuator arm coupled to said head, said actuator arm defining an aperture, the aperture receiving and engaging said stopping unit when said head is parked at said parking position, the aperture engaging said stopping unit with a friction force and not with a magnetic force the aperture immobilizing said head with a friction force and not with a magnetic force while said head is parked at said parking position.

2. The apparatus of claim 1, wherein said stopping unit further comprises a hemispherical upper portion engaging the aperture.

3. The apparatus of claim 1, wherein said stopping unit further comprises a conical upper portion engaging the aperture.

4. The apparatus of claim 1, wherein said stopping unit further comprises a clipped cone-shaped lower portion engaging said housing at said location corresponding to said parking position.

5. The apparatus of claim 1, wherein said stopping unit is mounted to said cover of said housing.

6. The apparatus of claim 1, wherein said stopping unit is mounted to said base of said housing.

7. The apparatus of claim 1, wherein the aperture is formed as a circular orifice.

8. The apparatus of claim 1, wherein the aperture is formed as a slot.

9. A disk drive apparatus, comprising:

a housing having a base and a cover;

a disk being rotatably mounted in said housing and having a plurality of tracks;

a head reading data from said disk and writing data to said disk when said head is located adjacent to said plurality of tracks, and said head not reading data and not writing data when said head is parked at a parking position not adjacent to said plurality of tracks;

a stopping unit being mounted at said housing at a location corresponding to said parking position; and a head actuator unit being coupled to said housing and to said head, said head actuator unit moving said head across said plurality of tracks of said disk and to and from said parking position, said head actuator unit defining an aperture;

when said head is parked at said parking position, the aperture engaging said stopping unit with a nonmagnetic force and immobilizing said head with a nonmagnetic force.

10. The apparatus of claim 9, wherein said stopping unit further comprises a hemispherical upper portion engaging the aperture.

11. The apparatus of claim 10, wherein said stopping unit further comprises a clipped cone-shaped lower portion engaging said housing at said location corresponding to said parking position.

12. The apparatus of claim 11, wherein said stopping unit is mounted to said base of said housing.

13. The apparatus of claim 11, wherein the aperture is formed as a slot.

14. The apparatus of claim 9, wherein said stopping unit further comprises a conical upper portion engaging the aperture.

15. The apparatus of claim 9, wherein said stopping unit is mounted to said cover of said housing.

16. The apparatus of claim 9, wherein the aperture is formed as a circular orifice.

17. A disk drive apparatus, comprising:

a housing having a base and a cover;

a disk being rotatably mounted in said housing and having a plurality of tracks;

a head reading data from said disk and writing data to said disk when said head is located adjacent to said plurality of tracks, and said head not reading data and not writing data when said head is immobilized at a parking position not adjacent to said plurality of tracks;

a stopping unit being mounted at said housing at a location corresponding to said parking position; and a head actuator unit being mounted in said housing, said head actuator unit being coupled to said head and moving said head across said plurality of tracks of said disk and to and from said parking position, said head actuator unit defining an aperture, the aperture engaging said stopping unit with a nonmagnetic force when said head is immobilized at said parking position, the nonmagnetic engagement of said stopping unit and the aperture preventing said head from moving from said parking position when the apparatus is bumped.

18. The apparatus of claim 17, wherein said stopping unit is formed from an elastic material and the aperture is formed from a rigid material.

19. The apparatus of claim 17, wherein said stopping unit is formed from a first elastic material and the aperture is formed from a second elastic material.

20. The apparatus of claim 17, wherein said stopping unit is formed from a rigid material and the aperture is formed from an elastic material.

* * * * *